United States Patent
Huang

(10) Patent No.: US 8,733,396 B2
(45) Date of Patent: May 27, 2014

(54) CONTROLLING SEAT STRUCTURE FOR A FAUCET

(76) Inventor: Chun-Chieh Huang, Xianxi Township, Changhua County (TW)

( * ) Notice: Subject to any disclaimer, the term of this patent is extended or adjusted under 35 U.S.C. 154(b) by 441 days.

(21) Appl. No.: 13/226,753

(22) Filed: Sep. 7, 2011

(65) Prior Publication Data

US 2013/0056664 A1 Mar. 7, 2013

(51) Int. Cl.
*F16K 11/06* (2006.01)

(52) U.S. Cl.
USPC .......................................... 137/625.4; 137/269

(58) Field of Classification Search
USPC .......... 137/269, 625.17, 625.4, 625.41; 4/677
See application file for complete search history.

(56) References Cited

U.S. PATENT DOCUMENTS

| | | | | |
|---|---|---|---|---|
| 5,325,887 A | * | 7/1994 | Egli et al. | 137/270 |
| 5,706,871 A | * | 1/1998 | Andersson et al. | 141/59 |
| 5,806,552 A | * | 9/1998 | Martin, Jr. | 137/270 |
| 5,853,023 A | * | 12/1998 | Orlandi et al. | 137/271 |
| 6,227,246 B1 | * | 5/2001 | Hall et al. | 137/625.41 |
| 6,237,622 B1 | * | 5/2001 | Cook et al. | 137/270 |
| 6,371,163 B1 | * | 4/2002 | Kahle et al. | 137/625.4 |
| 6,757,921 B2 | * | 7/2004 | Esche | 4/677 |
| 8,453,669 B2 | * | 6/2013 | Veros et al. | 137/315.13 |

* cited by examiner

*Primary Examiner* — John Fox
(74) *Attorney, Agent, or Firm* — Alan Kamrath; Kamrath IP Lawfirm, P.A.

(57) ABSTRACT

A controlling seat structure for a faucet contain a body connecting with an outlet pipe and including a controlling seat extending outward from one side thereof, the controlling seat including a cavity to receive a control valve with a lever, a locking member locked on the controlling seat of the body to position the control valve, and the controlling member being fitted on the lever of the control valve, the cavity including a first inlet, a second inlet, an outlet, and two positioning holes, all of which are fixed on an inner bottom of the cavity, characterized in that: between the inner bottom of the cavity of the controlling seat and the control valve is defined an adjusting member, and the adjusting member includes a first, a second, a third orifices, two fourth orifices, a first, a second, a third apertures and two pillars.

3 Claims, 7 Drawing Sheets

CONTROLLING SEAT STRUCTURE FOR A FAUCET

BACKGROUND OF THE INVENTION

1. Field of the Invention

The present invention relates to a faucet, and more particularly to a controlling seat structure for the faucet to be operated easily by changing a water flowing position.

2. Description of the Prior Art

A conventional faucet to supply cold water and hot water is designed in a double-handle or a single handle type. As shown in FIGS. 9 and 10, a conventional single-handle faucet comprises a body 10, a control valve 20, a locking member 30, a controlling member 40, and an outlet pipe 50, wherein the body 10 includes a chamber 101 disposed on an upper side thereof and a controlling seat 102 extending outward from one side thereof, the controlling seat 102 includes a first inlet 1021, a second inlet 1022, an outlet 1023, and two positioning holes 1024, all of which are fixed on an inner bottom of the controlling seat 102, wherein the first inlet 1021 and the second inlet 1022 are located at a same level line, the control valve 20 is secured in the controlling seat 102 of the body 10 and includes a lever 201 disposed on an outer side thereof to be rotated frontward and rearward so as to control water to flow outward or inward, and the locking member 30 is locked on the controlling seat 102 of the body 10 so that the control valve 20 is fixed, the controlling member 40 is fitted on the lever 201 of the control valve 20 and includes a handle 401 extending outward from one side thereof, the outlet pipe 50 includes a lower segment inserted into the chamber 101 of the body 10.

However, the first inlet 1021 and the second inlet 1022 of the controlling seat 102 of the body 10 are located at the same level line, so when the water flows out of the first inlet 1021 and the second inlet 1022 at an even quantity, the handle 401 of the controlling member 40 is located at a first position to stand upright, hence when rotating the handle 401 of the controlling member 40 rearward to shift water flow, the handle 401 is close to or contact with a wall A to limit a rotating space of the controlling member 40, causing an operating inconvenience without shifting the water flow.

The present invention has arisen to mitigate and/or obviate the afore-described disadvantages.

SUMMARY OF THE INVENTION

The primary object of the present invention is to provide a controlling seat structure for a faucet that is capable of changing a rotating position of a handle of a controlling member to obtain a communicating and position purpose.

Another object of the present invention is to provide a controlling seat structure for a faucet in which a body includes another adjusting member disposed in a cavity of a controlling seat to change a water flowing position so that the handle of the controlling member is rotated to leave away from a wall, thus operating the faucet normally and easily.

To obtain the above objectives, a controlling seat structure for a faucet provided by the present invention contains:

a body connecting with an outlet pipe and including a controlling seat extending outward from one side thereof, the controlling seat including a cavity to receive a control valve with a lever, a locking member locked on the controlling seat of the body to position the control valve, and the controlling member being fitted on the lever of the control valve, and the cavity including a first inlet, a second inlet, an outlet, and two positioning holes, all of which are fixed on an inner bottom of the cavity, characterized in that:

between the inner bottom of the cavity of the controlling seat and the control valve is defined an adjusting member to be secured in the cavity, and the adjusting member includes a first orifice to flow water inward, a second orifice to flow the water inward, a third orifice to flow the water outward, and two fourth orifices, all of which are arranged on a front side thereof, wherein the first, the second, the third, the two fourth orifices and the first inlet, the second inlet, the outlet, and the two positioning holes form a tilted angle, and the adjusting member includes a first aperture to flow the water inward, a second aperture to flow the water inward, a third aperture to flow the water outward, and two pillars, all of which are formed on a back side of the adjusting member, such that the first orifice communicates with the first inlet by using the first aperture, the second orifice is in communication with the second inlet by ways of the second aperture, the third orifice communicates with the outlet by means of the third aperture.

DETAILED DESCRIPTION OF THE PREFERRED EMBODIMENTS

Figure 1:
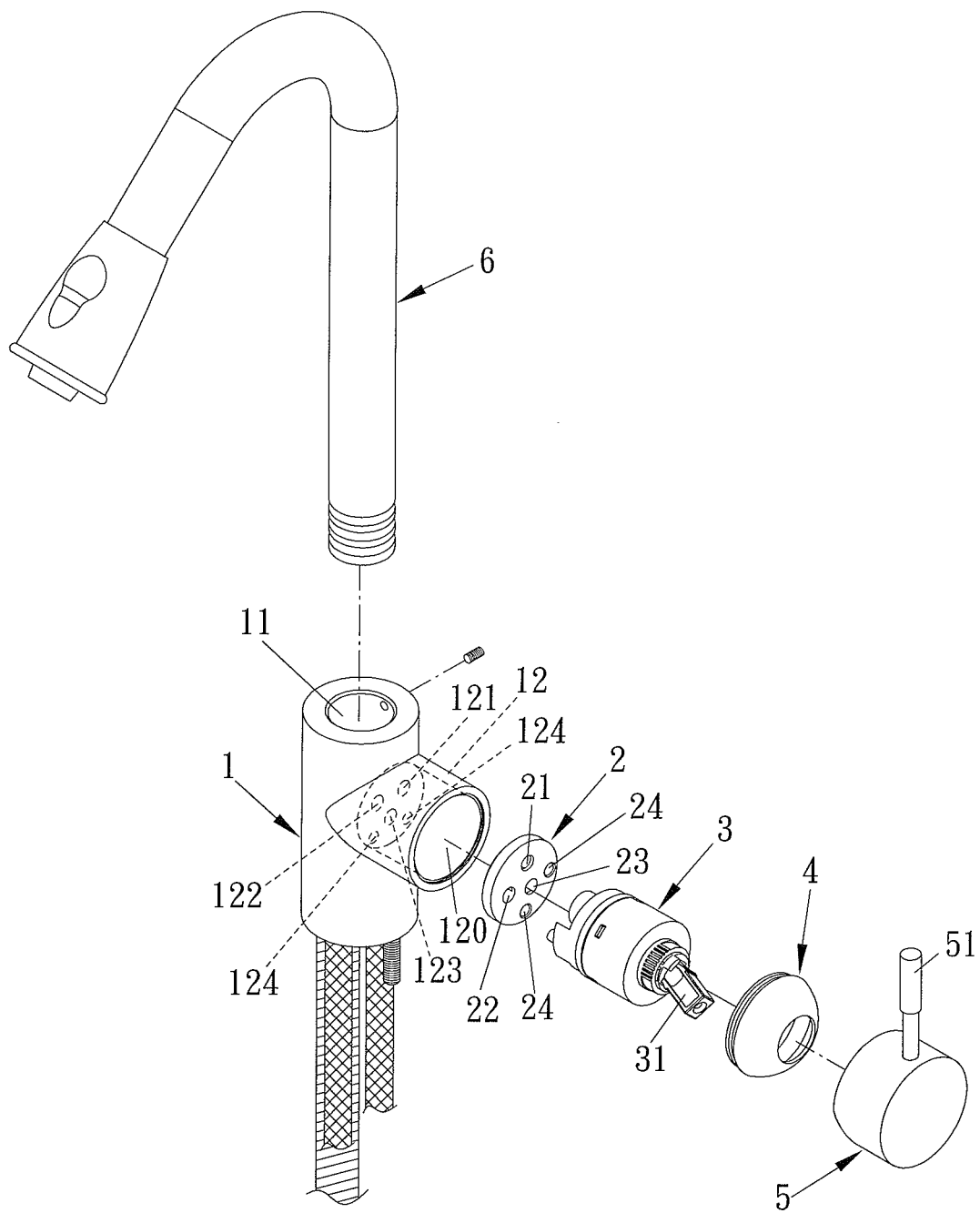
FIG. 1 is a perspective view showing the exploded components of a faucet according to a preferred embodiment of the present invention.
Figure 2:
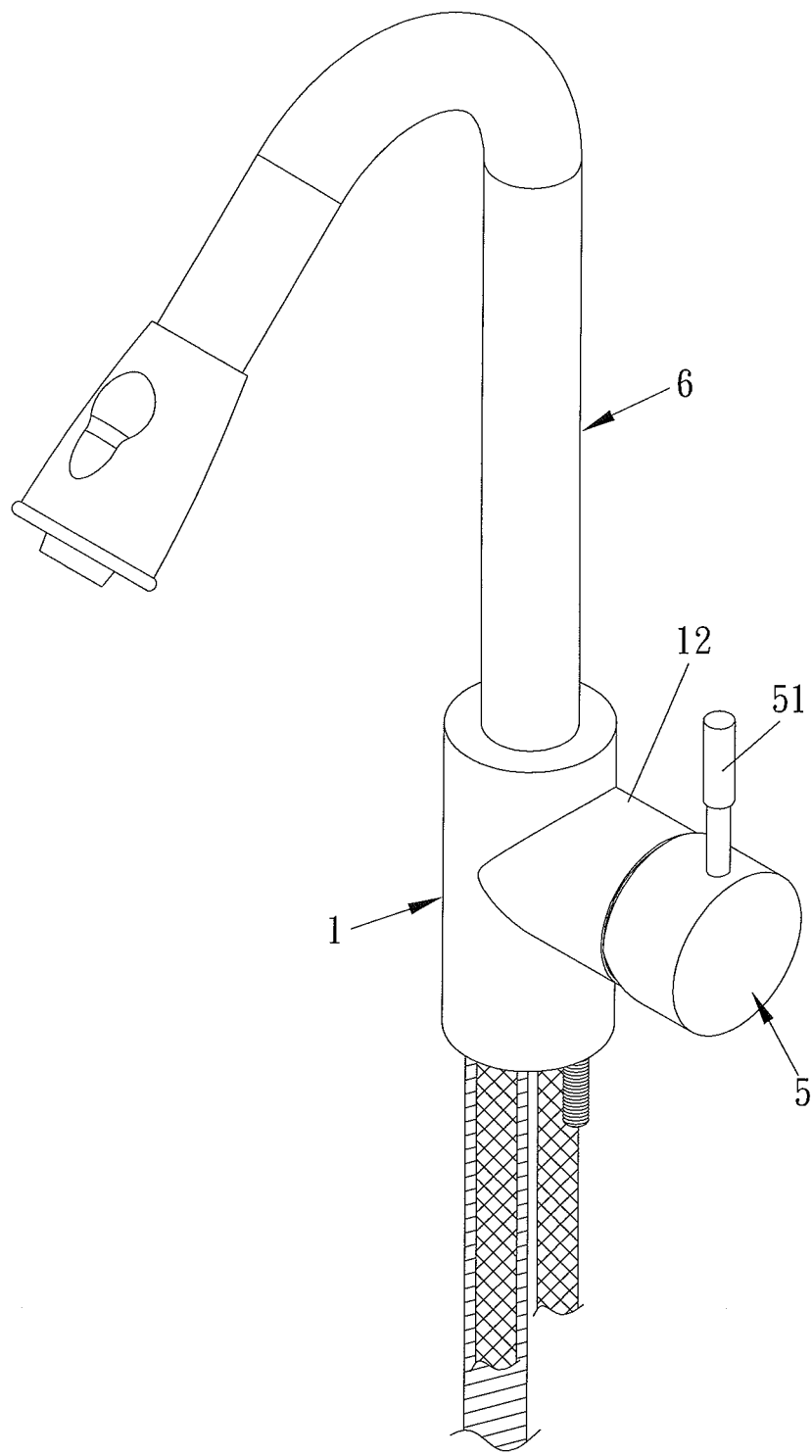
FIG. 2 is a perspective view showing the assembly of the faucet according to the preferred embodiment of the present invention.
Figure 5:
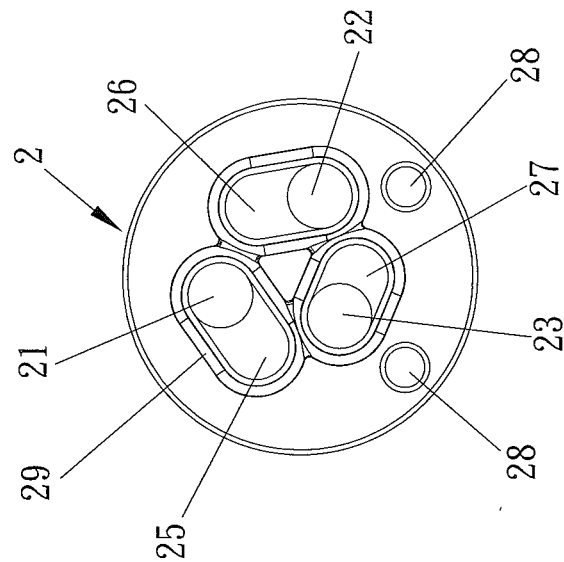
FIG. 5 is a plan view showing the assembly of the adjusting member according to the preferred embodiment of the present invention.
Figure 4:
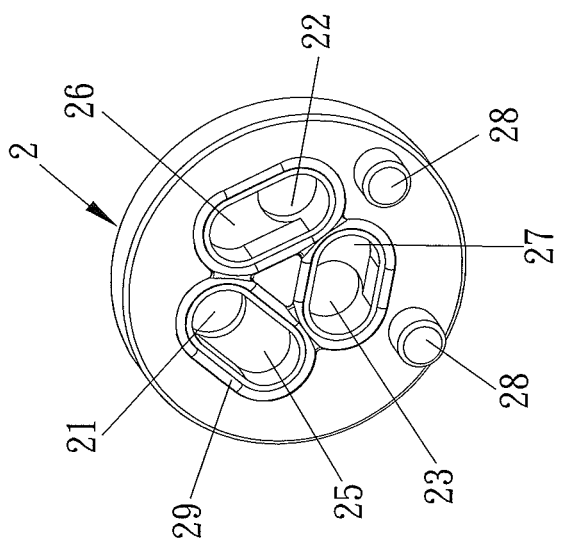
FIG. 4 is another perspective view showing the assembly of the adjusting member according to the preferred embodiment of the present invention.
Figure 3:
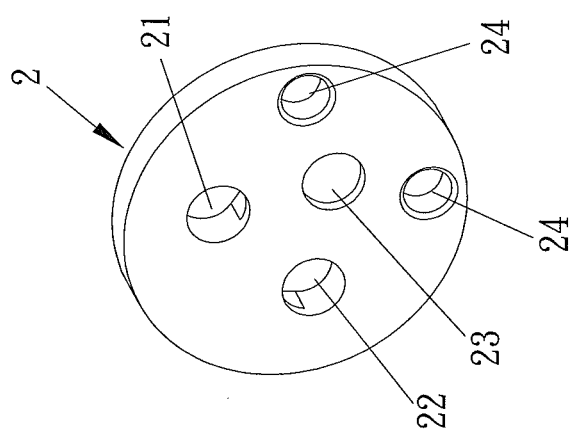
FIG. 3 is a perspective view showing the assembly of an adjusting member according to the preferred embodiment of the present invention.
Figure 7:
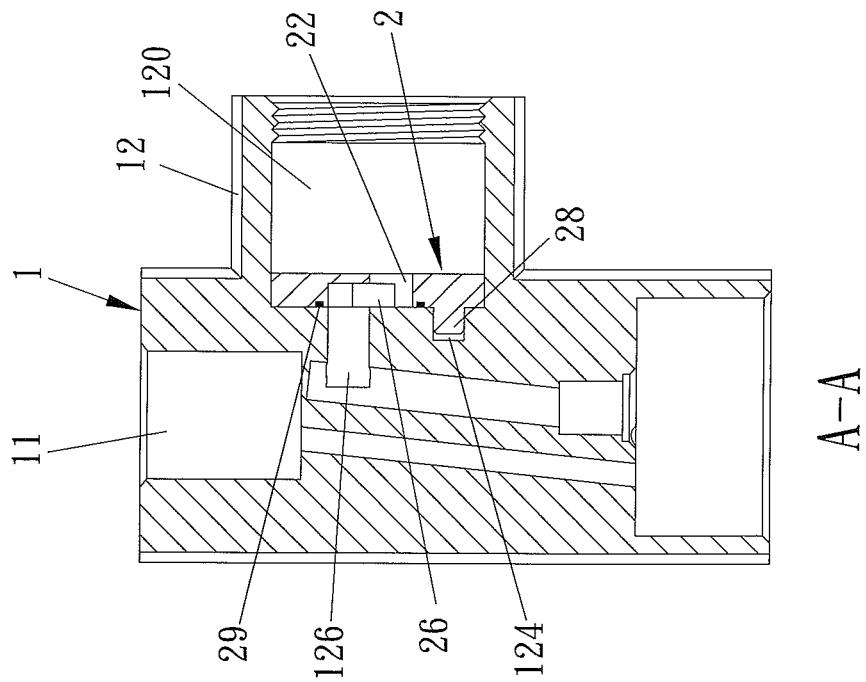
FIG. 7 is a cross sectional view showing the assembly of a part of the faucet according to the preferred embodiment of the present invention.
Figure 6:
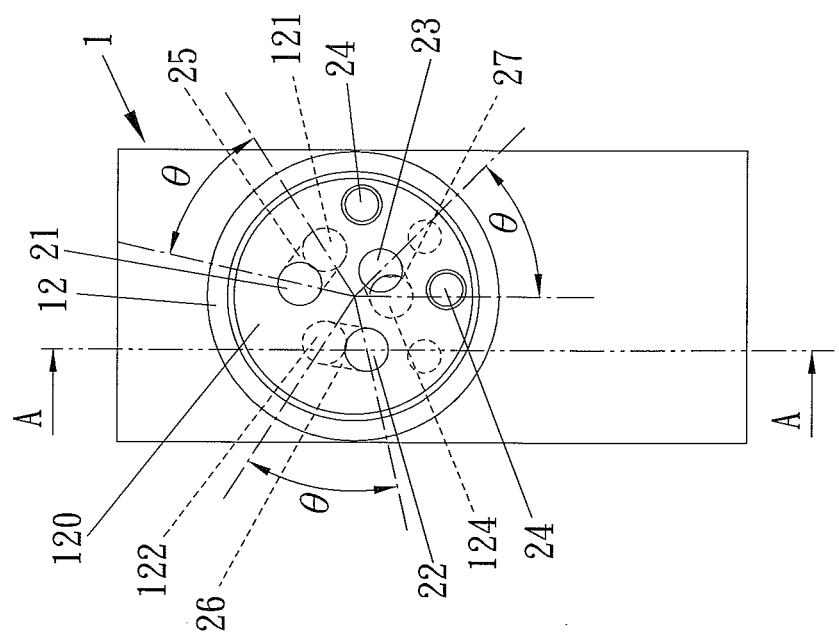
FIG. 6 is a plan view showing the operation of the adjusting member according to the preferred embodiment of the present invention.

The present invention will be clearer from the following description when viewed together with the accompanying drawings, which show, for purpose of illustrations only, the preferred embodiment in accordance with the present invention.

With reference to FIGS. 1-7, a controlling seat structure for a faucet according to a preferred embodiment of the present invention comprises a body 1, an adjusting member 2, a control valve 3, a locking member 4, a controlling member 5, and an outlet pipe 6, wherein the body 1 includes a chamber 11 disposed on an upper side thereof and a controlling seat 12 extending outward from one side thereof, the controlling seat 12 includes a cavity 120, and the cavity 120 includes a first inlet 121, a second inlet 122, an outlet 123, and two positioning holes 124, all of which are fixed on an inner bottom of the cavity 120, wherein the first inlet 121 and the second inlet 122 are located at a same level line, the adjusting member 2 is secured in the cavity 120 and includes a first orifice 21 to flow water inward, a second orifice 22 to flow the water inward, a third orifice 23 to flow the water outward, and two fourth orifices 24, all of which are arranged on a front side thereof, wherein the first, the second, the third, the two fourth orifices 21, 22, 23, 24 and the first inlet 121, the second inlet 122, the outlet 123, and the two positioning holes 124 form a clockwise rotary tilted angle θ (it is preferable that the tilted angle θ is between 30 to 50 degrees), and the adjusting member 2 includes an elongated circular first aperture 25 to flow the water inward, an elongated circular second aperture 26 to flow the water inward, an elongated circular third aperture 27 to flow the water outward, and two pillars 28, all of which are formed on a back side of the adjusting member 2, and three stopping loops 29 are disposed around outer peripheral sides of the first aperture 25, the second aperture 26, and the third aperture 27 respectively, the first orifice 21 communicates with the first inlet 121 by using the first aperture 25, the second orifice 22 is in communication with the second inlet 122 by ways of the second aperture 26, the third orifice 23 communicates with the outlet 123 by means of the third aperture 27, and the two pillars 28 are inserted into the two positioning holes 124 individually, the three stopping loops 29 of the adjusting member 2 are biased against the inner bottom of the cavity 120 to stop the water, the control valve 3 is fixed in the cavity 120 of the controlling seat 12 of the body 1 to retain with the two fourth orifices 24 of the adjusting member 2 and includes a lever 31 disposed on an outer side thereof to be rotated frontward and rearward so as to control the water to flow outward or inward, the locking member 4 is locked on the controlling seat 12 of the body 1 to position the control valve 3, and the controlling member 5 is fitted on the lever 31 of the control valve 3 and includes a handle 51 extending outward from one side thereof, the outlet pipe 6 includes a lower segment inserted into the chamber 11 of the body 1.

Figure 8:
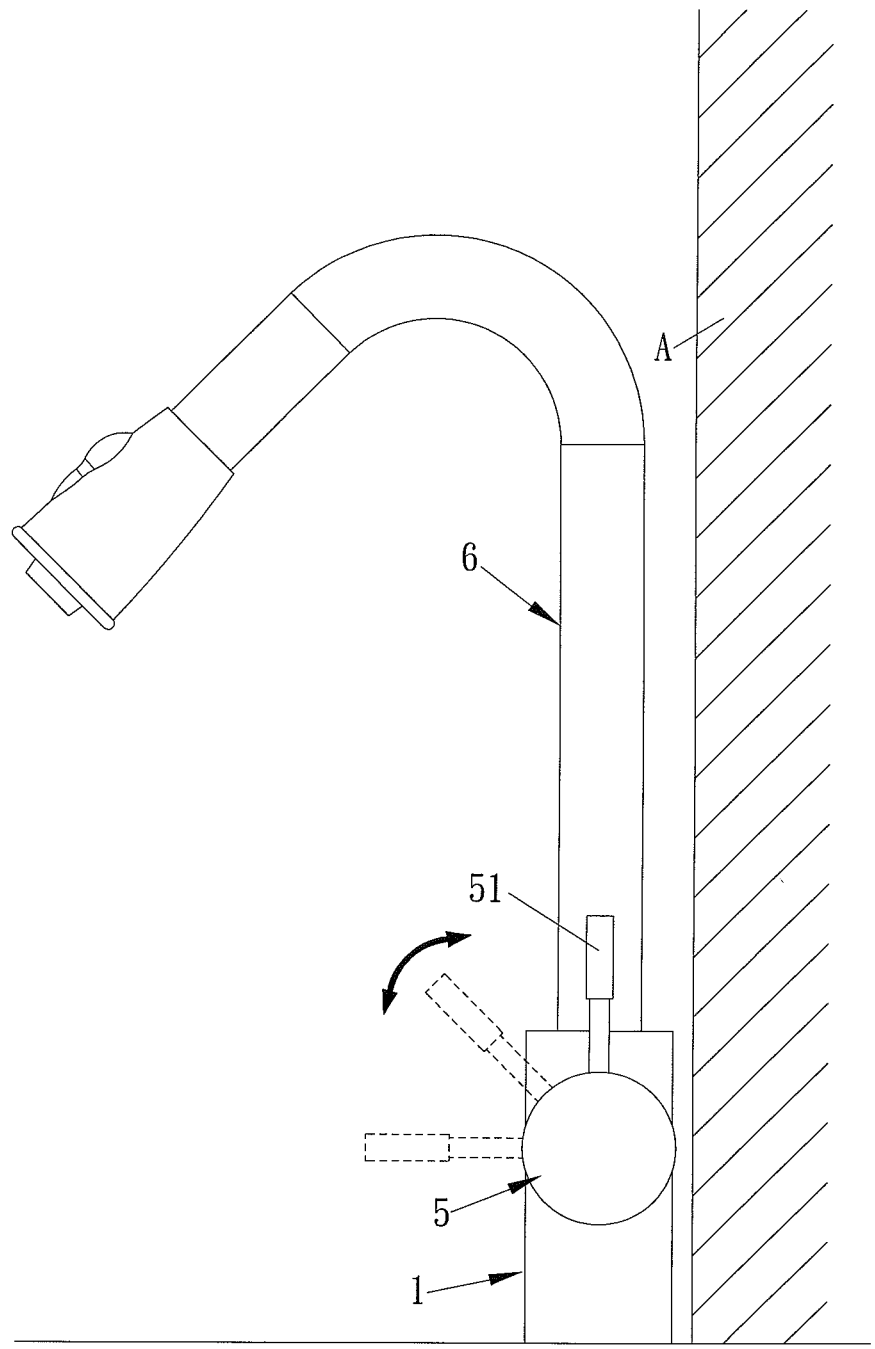
FIG. 8 is a plan view showing the operation of the faucet according to the preferred embodiment of the present invention.
Figure 9:
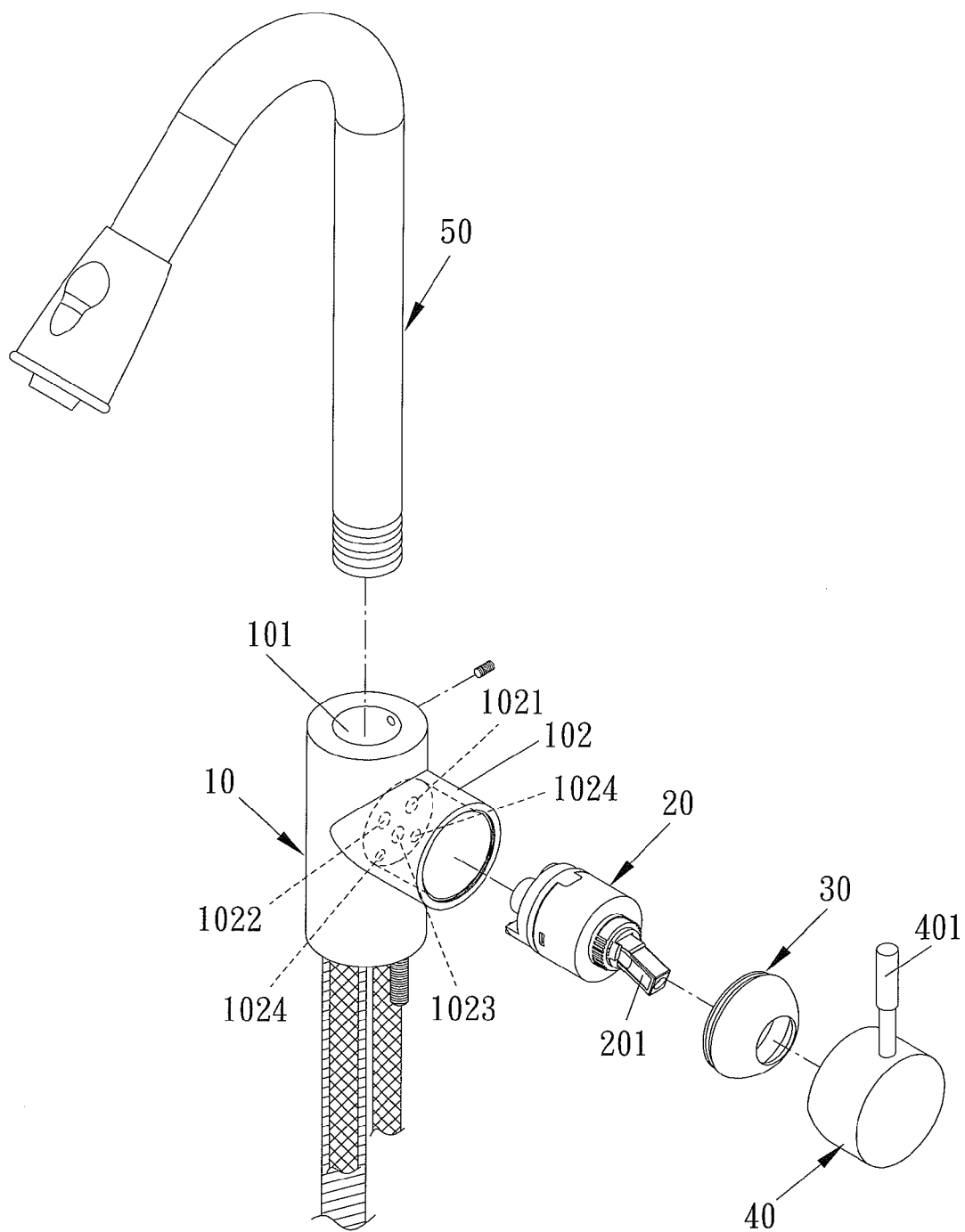
FIG. 9 is a perspective view showing the exploded components of a conventional single-handle faucet.
Figure 10:
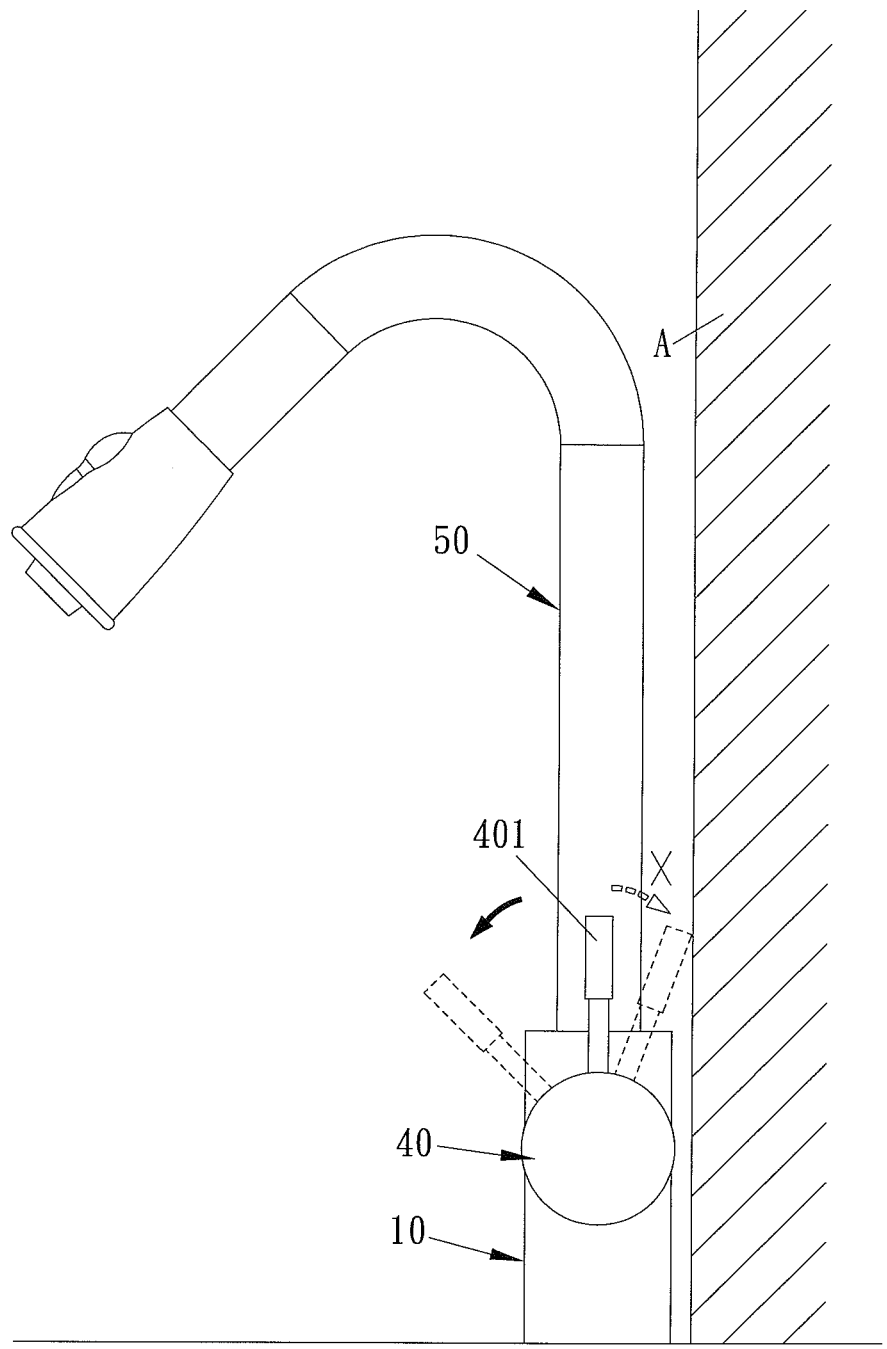
FIG. 10 is a plan view showing the operation of the conventional single-handle faucet.

As shown in FIG. 8, when cold water flows out of the faucet, the handle 51 of the controlling member 5 is located at a first position to stand upright; when hot water flows out of the faucet, the handle 51 of the controlling member 5 is located at a second position to lie horizontally. Thereby, the handle 51 of the controlling member 5 is rotated to move within a certain angular range between the first position and the second position.

Furthermore, the body 1 includes another adjusting member 2 disposed in the cavity 120 of the controlling seat 12 to change a water flowing position so that the handle 51 of the controlling member 5 is rotated to leave away from a wall A, thus operating the faucet normally and easily.

While we have shown and described various embodiments in accordance with the present invention, it is clear to those skilled in the art that further embodiments may be made without departing from the scope of the present invention.

What is claimed is:
1. A controlling seat structure for a faucet comprising:
a body connecting with an outlet pipe and including a controlling seat extending outward from one side thereof, the controlling seat including a cavity to receive a control valve with a lever, a locking member locked on the controlling seat of the body to position the control valve, and a controlling member being fitted on the lever of the control valve, and the cavity including a first inlet, a second inlet, an outlet, and two positioning holes, all of which are fixed on an inner bottom of the cavity, characterized in that:
between the inner bottom of the cavity of the controlling seat and the control valve is defined an adjusting member to be secured in the cavity, and the adjusting member includes a first orifice to flow water inward, a second orifice to flow the water inward, a third orifice to flow the water outward, and two fourth orifices, all of which are arranged on a front side thereof, wherein the first, the second, the third, the two fourth orifices and the first inlet, the second inlet, the outlet, and the two positioning holes form a tilted angle, and the adjusting member includes a first aperture to flow the water inward, a second aperture to flow the water inward, a third aperture to flow the water outward, and two pillars, all of which are formed on a back side of the adjusting member, such that the first orifice communicates with the first inlet by using the first aperture, the second orifice is in communication with the second inlet by ways of the second aperture, the third orifice communicates with the outlet by means of the third aperture.

2. The controlling seat structure for the faucet as claimed in claim 1, wherein tilted angle is between 30 to 50 degrees.

3. The controlling seat structure for the faucet as claimed in claim 1, wherein the first aperture, the second aperture, and the third aperture are elongated circular.

* * * * *